United States Patent [19]

Kurosawa et al.

[11] Patent Number: 4,542,834

[45] Date of Patent: Sep. 24, 1985

[54] DISPENSING MECHANISM FOR VENDING MACHINES

[75] Inventors: Akihito Kurosawa; Osamu Anazawa, both of Maebashi, Japan

[73] Assignee: Sanden Corporation, Isesaki, Japan

[21] Appl. No.: 559,468

[22] Filed: Dec. 8, 1983

[30] Foreign Application Priority Data

Dec. 8, 1982 [JP] Japan .............................. 57-215085
Dec. 8, 1982 [JP] Japan .............................. 57-215086

[51] Int. Cl.[4] ......................... B65G 59/06; B65H 3/44

[52] U.S. Cl. .................................... 221/116; 221/251; 221/298

[58] Field of Search ............... 221/251, 116, 117, 126, 221/131, 295, 298

[56] References Cited

U.S. PATENT DOCUMENTS 3,055,548 9/1962 Allegri ........................... 221/131 X
4,013,179 3/1977 Fluck ............................. 221/251 X
4,423,828 1/1984 Tanaka et al. ...................... 221/131

FOREIGN PATENT DOCUMENTS 2006315 8/1971 Fed. Rep. of Germany ...... 221/251

*Primary Examiner*—Richard E. Gluck

*Attorney, Agent, or Firm*—Banner, Birch, McKie & Beckett

[57] ABSTRACT

An article dispenser for dispensing articles from a vending machine is disclosed. The article dispenser includes an article storage area which has a bottom opening through which articles are dispensed and a front opening through which the articles are loaded to form two vertically adjacent rows. An article dispensing mechanism dispenses the lowermost articles stacked in the storage area through the bottom opening. This article dispensing mechanism includes a rotatable shaft which vertically extends within the storage area to divide the storage area into the two vertical rows or columns. A control plate is fixed to the lower end of the rotatable shaft to control the operation of a pair of flappers positioned below the two vertical rows of articles. As these flappers open and close upon rotation of the rotatable shaft, the lowermost articles in the storage area are dispensed. The article dispensing mechanism further includes an article holding mechanism located at the lower end of the storage area to hold the articles in both rows, except the lowermost articles, in a stacked position during the opening of the flappers. The holding mechanism includes opposite holding surfaces which frictionally engage adjacent articles in both rows to hold these articles between the holding surfaces and the inner surfaces of the storage area.

6 Claims, 23 Drawing Figures

DISPENSING MECHANISM FOR VENDING MACHINES

TECHNICAL FIELD

This invention relates to vending machines, and more particularly, to a dispensing mechanism for a vending machine which is adapted to dispense rectangular parallelepiped or cube shaped paper cartons containing a beverage or other liquid.

BACKGROUND OF THE INVENTION

Various types of dispensing mechanisms have been used depending on the types of food products or goods vended. One well known type of dispensing mechanisms is a spiral type dispensing mechanism which is used to vend bottles or cans.

Spiral type dispensing mechanisms include a vertical shaft with end portions journaled at the upper and lower ends of a storage area. A spiral or helical element is disposed around and connected to the vertical shaft for rotation with the shaft. The articles or package goods are loaded along the spiral element and the vertical shaft. These packages are moved downwardly by the rotation of the spiral element and delivered one by one from the lower end of the shaft.

In this type of mechanism, the spiral element is located adjacent to each of the packages, i.e., the spiral element extends between the upper and lower portions of each package and forms an axial gap between adjacent packages. However, since each package must be loaded into the axial gaps of the spiral element one by one, the number of articles or packages which can be loaded into a predetermined space is reduced. Also, loading of the articles into the dispensing mechanism is complicated and time consuming.

Another type of dispensing mechanism, known as a chain-elevator type dispensing mechanism, is shown in U.S. Pat. No. 3,193,135. Chain-elevator type dispensing mechanisms are suitable for vending packages or cartons. A chain-elevator type dispensing mechanism includes a plurality of supporting elements, each of which carries articles or packages. The supporting elements are connected to a chain, which is vertically moved due to operation of a motor. In this mechanism, the construction of the operative elements is very complicated, and the loading of packages or articles is difficult.

A slant shelf type dispensing mechanism is another well known type of dispensing mechanism for vending bottles or cans. A slant shelf type dispensing mechanism, such as shown in U.S. Pat. No. 3,276,624, includes at least one slanted shelf member, which acts as a guide for dispensing articles, and a delivery member for dispensing the articles one by one from the slant shelf member. However, construction of this type mechanism is very complicated and expensive, and loading of the articles into the storage area is complicated. Also, since the distance between the delivery member and a delivery tray is generally long, articles may be damaged during delivery by striking against the delivery tray.

SUMMARY OF THE INVENTION

It is a primary object of this invention to provide a simple dispensing mechnism for vending machines in which articles are positively held in a narrow space.

It is another object of this invention to provide a dispensing mechanism for vending machines in which loading of articles is accomplished in a simple operation.

It is still another object of this invention to provide a dispensing mechanism for vending machines in which articles are easily released and ejected from a storage area.

It is a further object of this invention to realize the above objects with a simple construction and at a low cost.

A dispensing mechanism for vending machines according to this invention includes an article storage area for storing articles in a stacked disposition above a bottom opening through which one or more articles are dispensed. A rotatable shaft vertically extends within the storage area and is rotatably supported by the storage area. This rotatable shaft operates a dispensing mechanism which is located at the lower end of the storage area above the bottom opening. The dispensing mechanism includes a pair of flappers rotatably supported by the storage area and disposed for covering the bottom opening. A control plate is attached to the lower end of the rotatable shaft for contacting the back surfaces of the flappers to control the pivoting of the flappers upon rotation of the rotatable shaft. A holding mechanism is mounted on the rotatable shaft in the storage area to hold all the articles except the lowermost articles in a stacked position on top of the lowermost articles. The holding mechanism is a rectangular shaped element with its two opposite short sides forming holding surfaces which frictionally engage the adjacent articles during a portion of the rotation of the rotatable shaft to prevent any articles other than the lowermost articles from being dispensed. Thus, the lowermost articles can be smoothly dispensed through the bottom opening of the storage area, while the remaining articles are securely held in their stacked position.

Further objects, features and other aspects of this invention will be understood from the following detailed description of the preferred embodiments of this invention referring to the annexed drawings.

BRIEF DESCRIPTION OF THE DRAWINGS

FIG. 15(*b*) is a sectional view taken along line F—F of FIG. 15*a*.

FIG. 16(*b*) is a sectional view taken along line G—G of FIG. 16*a*.

FIG. 17(*b*) is a sectional view taken along line H—H of FIG. 17*a*.

DETAILED DESCRIPTION OF THE PREFERRED EMBODIMENTS

Figure 2:
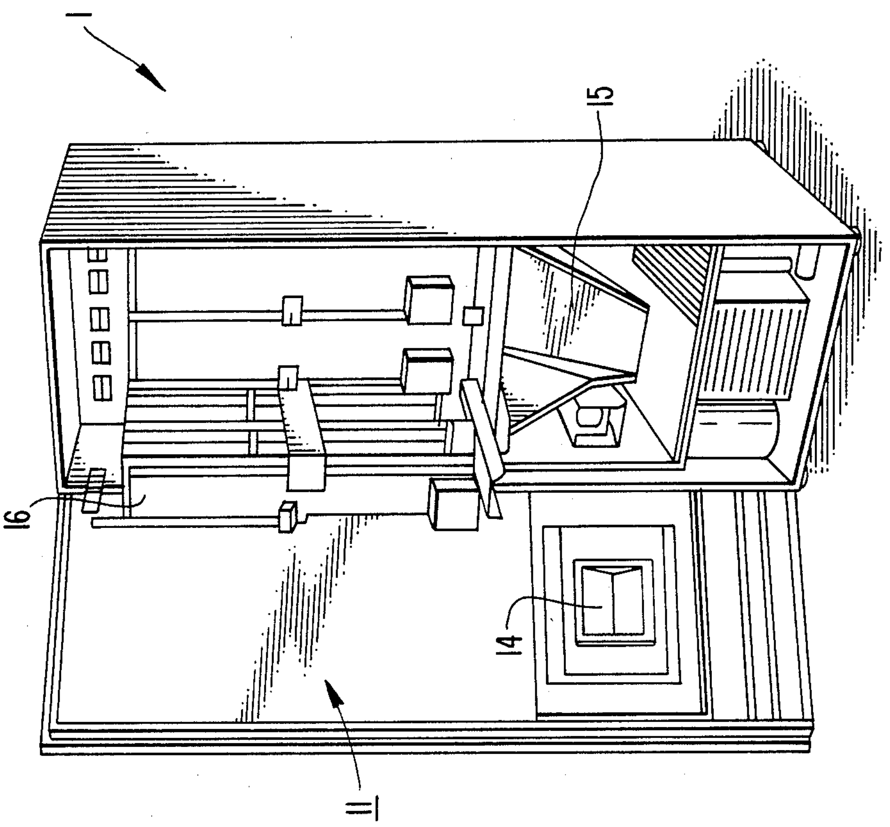
FIG. 2 is a perspective view of the vending machine of FIG. 1 with the loading door opened.
Figure 1:
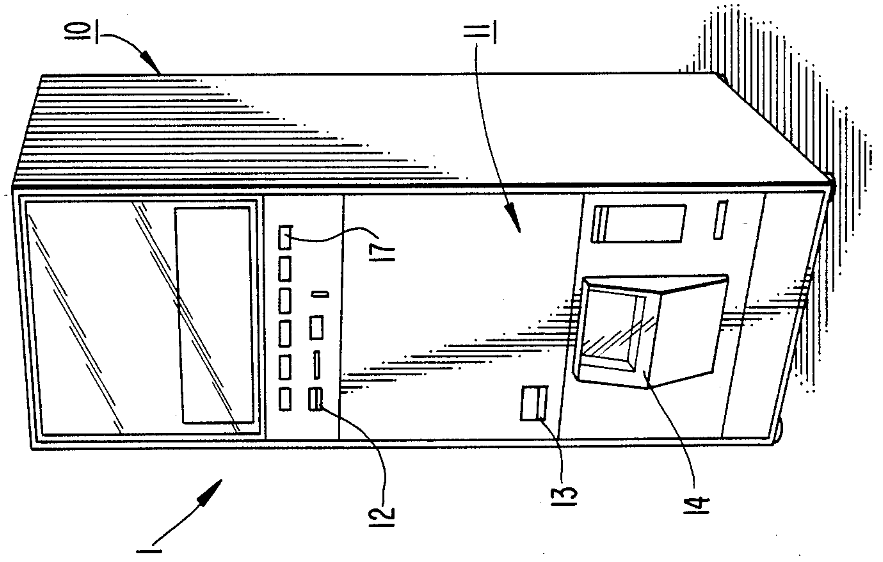
FIG. 1 is a perspective view of a vending machine containing an article dispensing mechanism according to the invention.

In FIGS. 1 and 2, article vending machine 1 is provided with cabinet 10 having loading door 11 which extends substantially across the face of cabinet 10 and is hinged along the left vertical edge of cabinet 10 in any suitable manner (not shown). Vending machine 1 also is provided with coin slot 12 and coin return opening 13 on the front face of loading door 11. Vending stage 14 is mounted in loading door 11 to communicate with interiorly disposed discharge hopper 15, which is loaced beneath a plurality of dispensers 16. Three such dispensers are used in the particular machine illustrated in FIGS. 1–2. A plurality of selector push buttons or switches 17 are provided across the upper front region of loading door 11.

Figure 3:
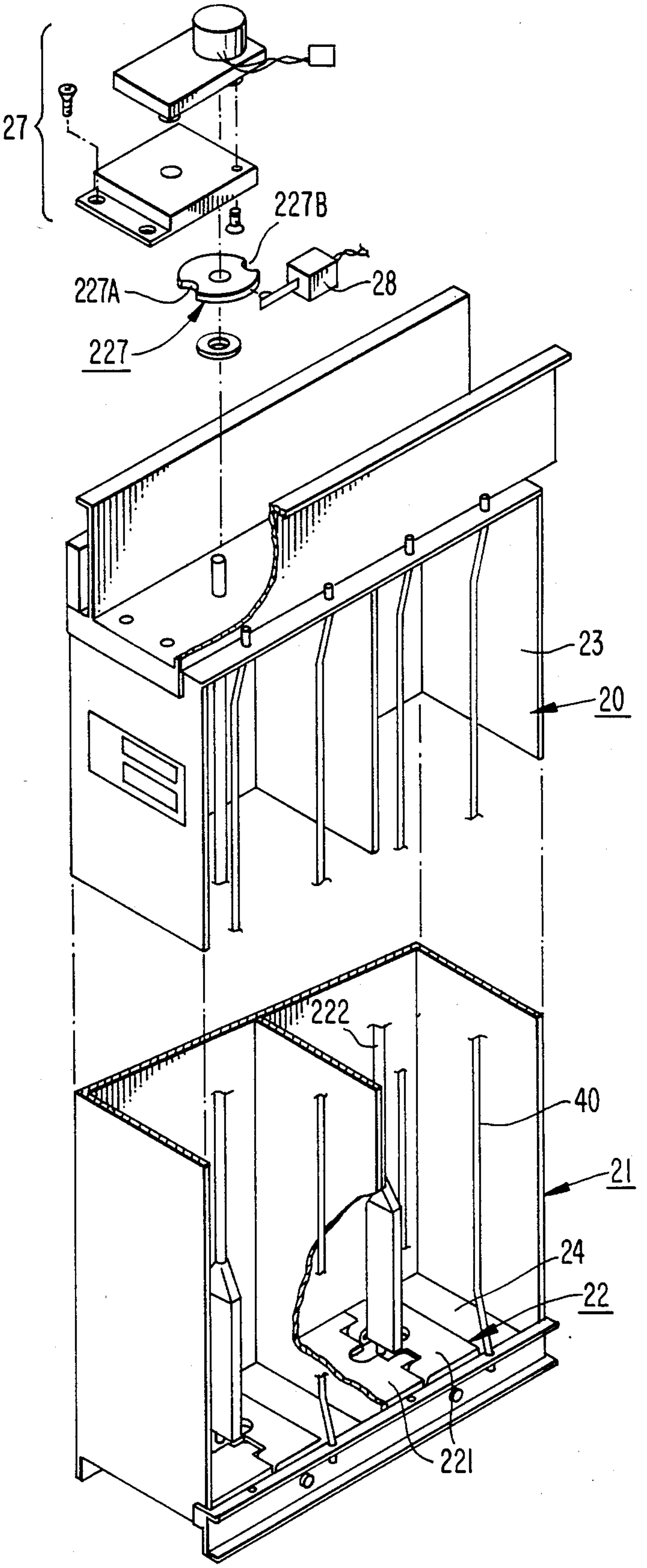
FIG. 3 is an exploded perspective view of an article dispensing mechanism used in FIG. 2.
Figure 4:
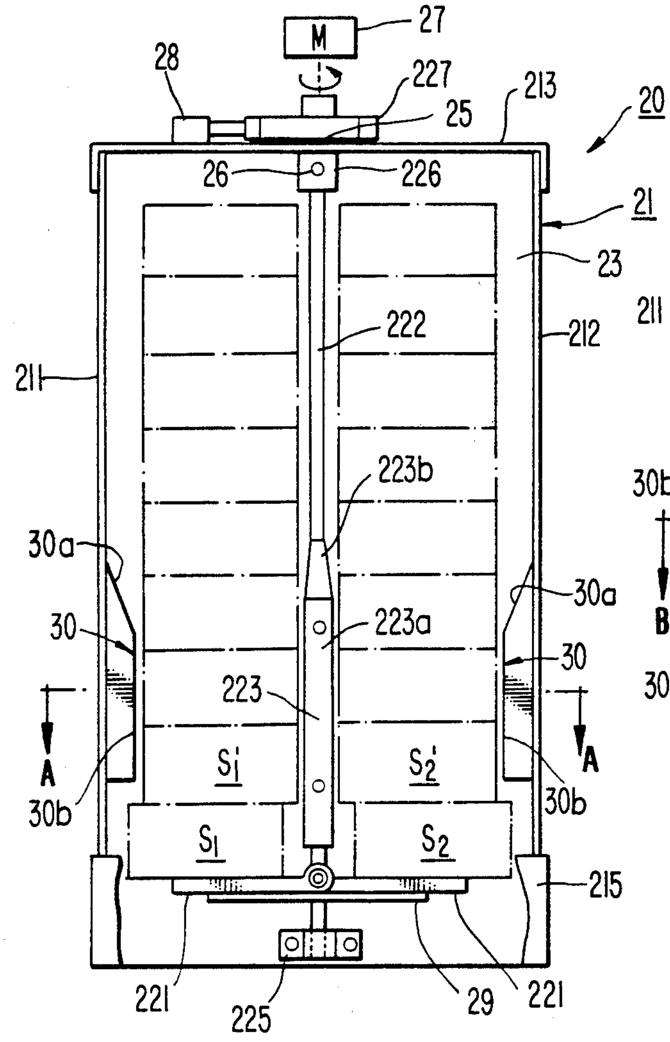
FIG. 4 is a front end view of an article dispensing mechanism according to the invention.
Figure 5:
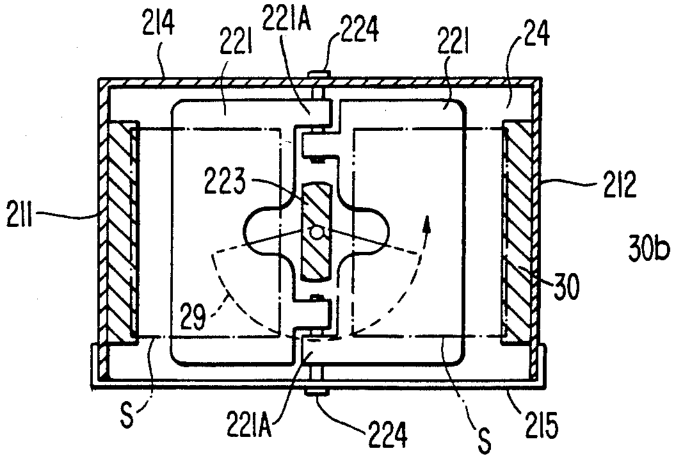
FIG. 5 is a sectional view taken along line A—A in FIG. 4.

As shown in FIGS. 3, 4 and 5, each dispenser 16 includes two dispensing units 20 mounted next to one another with a common partition wall extending between units 20. Units 20 include article storage area 21 and article dispensing mechanism 22. Article storage area 21 comprises vertically disposed side plates 211 and 212, one of which is used as the partitioning wall, upper plate 213 and back plate 214. Front support plate 215 is connected across the front lower portion of side plates 211 and 212. Front opening 23, which is formed between side plates 211 and 212, upper plate 213 and support plate 215, is used for loading articles into the storage area. As shown in FIG. 3, storage area 21 is provided with a suitable stopper, such as stopper rod 40 to prevent articles from dropping out of storage area 21 through opening 23. Storage area 21 also has bottom discharge opening 24 through which articles are dispensed.

Article dispensing mechanism 22 is disposed within article storage area 21 and comprises a pair of flappers or doors 221, rotatable shaft 222, holder member 223 and a driving mechanism for rotatable shaft 222. Support shafts 224 are removably disposed on front support plate 215 and back plate 214, respectively. These support shafts 224 are axially spaced from one another and extend along a common axis. Each rectangular shaped flapper or door 221 is pivotably supported by support shafts 224 through a pair of supporting portions 221A extending from an edge of flapper 221 adjacent rotatable shaft 222. The pair of rectangular shaped flappers 221 are disposed in discharge opening 24 of storage area 21 to control the opening and closing of discharge opening 24. Rotatable shaft 222 vertically extends within the central portion of storage area 21 to divide storage area 21 into two columns for stacking the articles in two vertical rows or stacks at the left and right sides of rotatable shaft 222. Thus, one door or flapper 221 is placed in storage area 21 below each column or row of articles S. The lower end portion of rotatable shaft 222 is rotatably supported by support element 225 which is fixed to and extends from the inner surface of back plate 214. The upper end portion of rotatable shaft 222 is connected to the driving mechanism which is disposed on upper plate 213. The driving mechanism includes coupling member 226 which is rotatably supported by upper plate 213 through bearing 25. Rotatable shaft 222 is connected to coupling member 226 by pin 26. Coupling member 226 also is connected to motor 27 through a reduction mechanism. Thus, coupling member 226 is coupled between rotatable shaft 222 and motor 27 so that rotatable shaft 222 is driven by motor 27 through coupling member 226.

Coupling member 226 includes cam portion 227 which has two equiangular spaced cut-out portions 227A and 227B at its outer peripheral surface. A switch element, such as microswitch 28, is disposed adjacent the outer peripheral surface of cam portion 227 to control the operation of motor 27. A switch lever of microswitch 28 normally contacts the outer peripheral surface of cam portion 227 and moves in correspondence with the configuration of cam portion 227. Therefore, operation of microswitch 28 is controlled by rotation of cam portion 227. In this embodiment, cut-out portions 227A and 227B are formed at an angular offset of 180° so that motor 27 stops after rotatable shaft 222 rotates 180°. In particular, motor 27 is selectively operated in response to the deposit of a predetermined coin value by a customer and stops after rotatable shaft 222 rotates 180° from its starting position.

Rotatable shaft 222 also has arc shaped control plate 29 at its lower end portion. Control plate 29 contacts the lower or back surface of flappers 221. When control plate 29 is in contact with both flappers 221, these flappers lie in the horizontal position so that control plate 29 controls the pivoting of flappers 221 to prevent discharge of any articles S. When control plate 29 is rotated to contact only one of flappers 221, the other flapper pivots to an open position to permit discharge of an article.

Figure 12A:
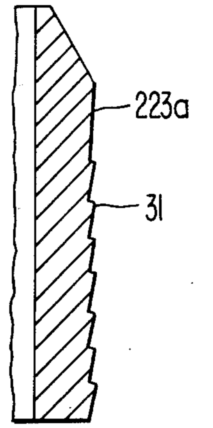
FIGS. 12(*a*) and (*b*) are cross-sectional views of a holder member used in the article dispensing mechanism of FIG. 4.
Figure 12B:
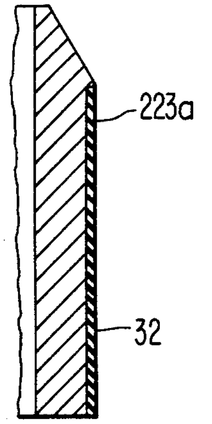

Holder member 223, which has a rectangular shaped cross-section with long and short sides, is removably attached to rotatable shaft 222 at a position adjacent its lower end portion, i.e., holder member 223 is at least aligned with articles $S_1'$ and $S_2'$ which are stacked above the lowermost articles $S_1$ and $S_2$ on the upper surface of flappers 211. The short side surfaces 223*a* of holder member 223 act as holding portions to engage the articles against the inner surface of side plates 211, 212 and hold the articles in position when shaft 222 is rotated while the articles below the held articles discharge through opening 24. Holder member 223 also has slanted upper portion 223*b* at its upper end which acts as a guide surface for the articles. Side spacers 30, which are removably attached to the inner surface of side plates 211 and 212, oppose holder member 223 so that articles are held between side spacers 30 and holder member 223. Side spacers 30 have slanted surface portion 30*a* formed as a guide surface and article holding surface 30*b*. The distance between article holding surface 30*b* and short side surface 223*a* of holder member 223 is selected to hold articles between surface 223*a* and 30*b* when these surfaces are opposed to one another. In the latter orientation of these surfaces, downward movement of articles is prevented by the frictional resistance of holding surface 30*b* and/or short side surface 223*a*. The holding capability or frictional resistance of surfaces 223*a* and 30*b* can be improved by including an antiskid element on these surfaces such as shown in FIGS. 12(*a*) and 12(*b*). In FIG. 12(*a*), short side surface 223*a* of holder member 223 is provided with notched surface 31 and, in FIG. 12(*b*), rubber sheet 32 is fastened to surface 223*a* to prevent slippage of articles $S_1'$, $S_2'$ when holder member 223 is in its holding position.

Figure 6:
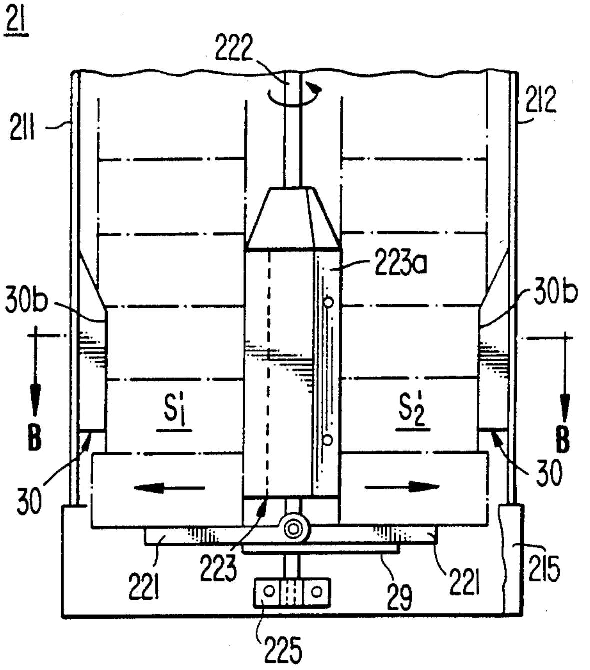
FIG. 6 is a partial front end view of the article dispensing mechanism of FIG. 3 illustrating its operation.
Figure 7:
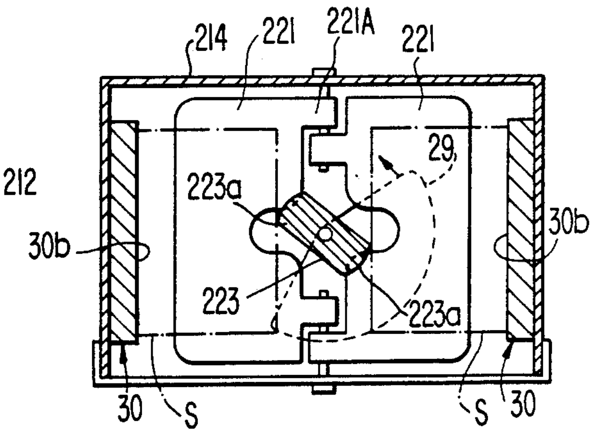
FIG. 7 is a sectional view taken along line B—B in FIG. 6.

Referring to FIGS. 6 and 7, the operation of article dispenser 16 will be described. Articles or packages S containing beverages are loaded within storage area 21 through front opening space 23 and stacked on each door or flapper 221 to form two vertical rows. When motor 27 is energized by a signal from the vending switch, rotatable shaft 222, holder member 223 and control plate 29 are rotated through coupling member 226. The direction of rotation is shown by an arrow in FIG. 5. During rotation of rotatable shaft 222, the edges of rectangular shaped holder member 223 come into contact with the sides of articles $S_1'$, $S_2'$ and push these articles toward side spacers 30 as shown by arrows in FIG. 6. Just before control plate 29 moves from its contact position with both flappers 221 to a contact position with only one of the flappers, i.e., the rotatable shaft 222 has rotated almost 90° from its initial position, the articles $S_1'$ and $S_2'$ which are stacked above lowermost articles $S_1$, $S_2$ are frictionally engaged between holding surface 30*b* of side spacers 30 and short side surface 223*a* of holder member 223. Thus, the articles above lowermost articles $S_1$, $S_2$ on flappers 221 are held in their stacked position.

Figure 8:
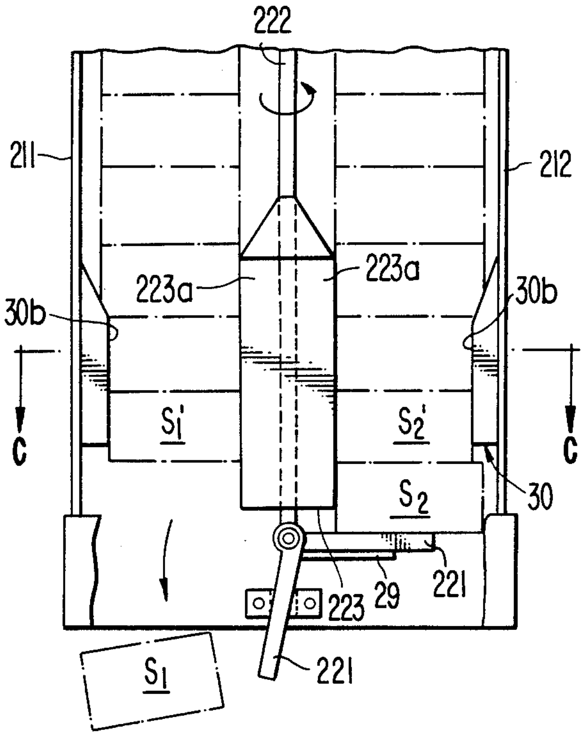
FIG. 8 is a partial front end view of the article dispensing mechanism of FIG. 3 illustrating its operation.
Figure 9:
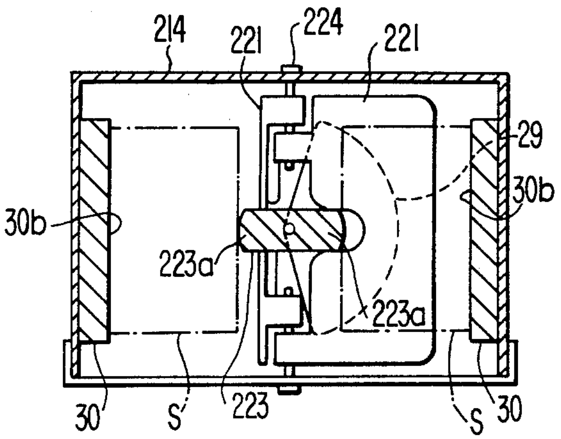
FIG. 9 is a sectional view taken along C—C in FIG. 8.

When rotatable shaft 222 is rotated more than 90°, one of flappers 221 is released from its horizontal position, and this one flapper pivots downward around support shafts 224. Then, as shown in FIGS. 8–9, article $S_1$ disposed on this one released flapper 221 is delivered to vending stage 14 through discharge opening 24 and hopper 15. At the same time, the other flapper 221 is kept in its horizontal position by control plate 29. As holder member 223 and control plate 29 continue to rotate, control plate 29 again contacts the one released flapper 221 and pushes it upward to its former horizontal position.

Figure 10:
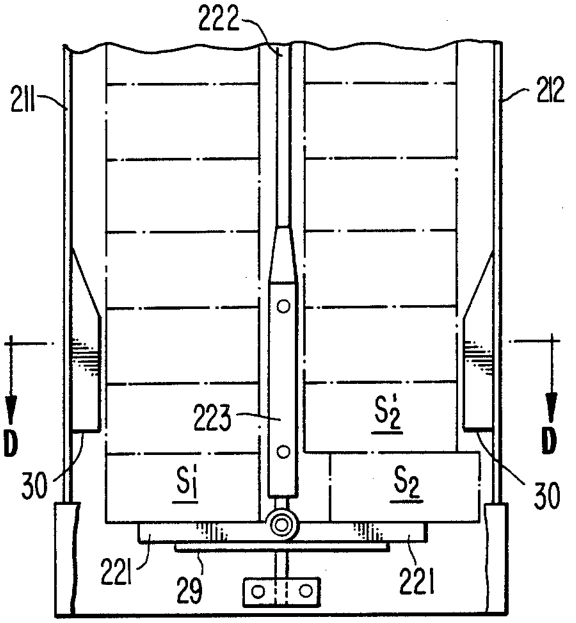
FIG. 10 is a partial front view of the article dispensing mechanism illustrating the final position in the dispensing operation.
Figure 11:
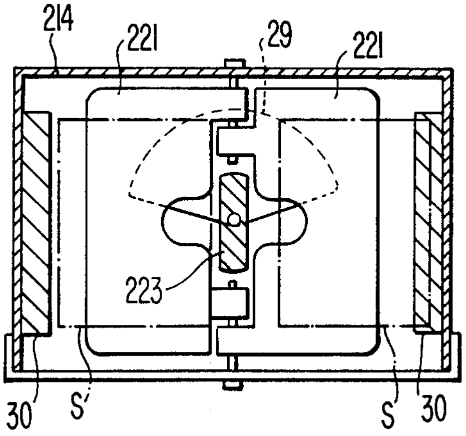
FIG. 11 is a cross-sectional view taken along line D—D in FIG. 10.

After rotatable shaft 222 rotates 180°, switch 28 is operated by cam 227 to stop motor 27 and position flappers 221 and holding member 223 in the position shown in FIGS. 10 and 11. At this time, articles $S_1'$, $S_2'$ are released from holder member 223 and side spacers 30 and one of the articles, article $S_1'$ slides down on top of flapper 221. The lowermost article, article $S_2$, disposed on the other flapper 221 is dispensed by the next operation of the dispenser in the same manner as described above in connection with article $S_1$.

Figure 13:
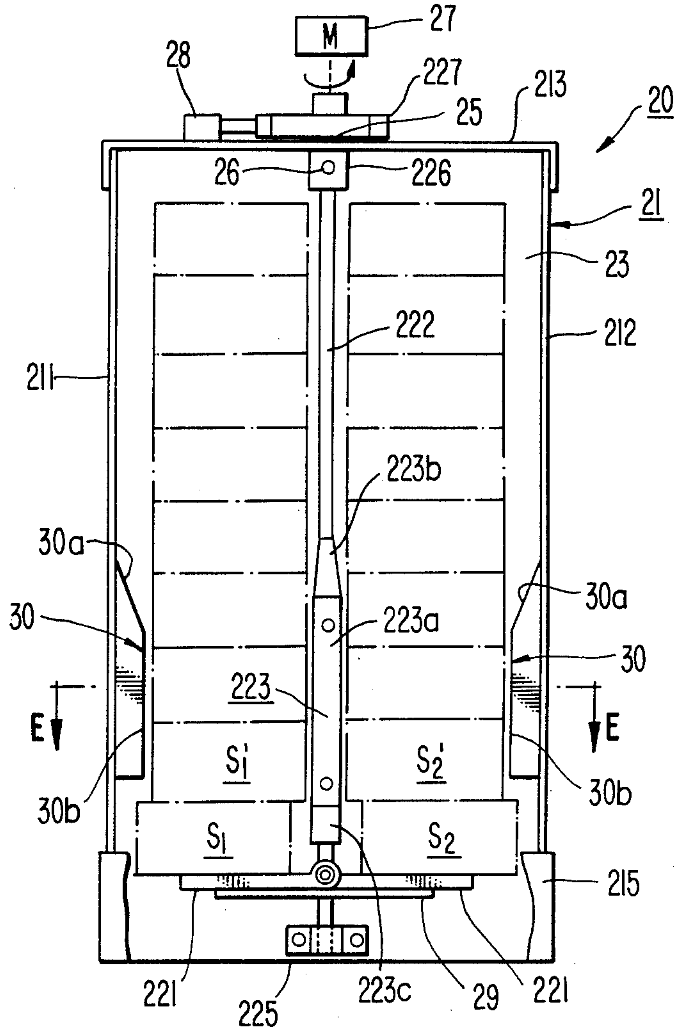
FIG. 13 is a front end view of an article dispensing mechanism according to another embodiment of this invention.
Figure 14:
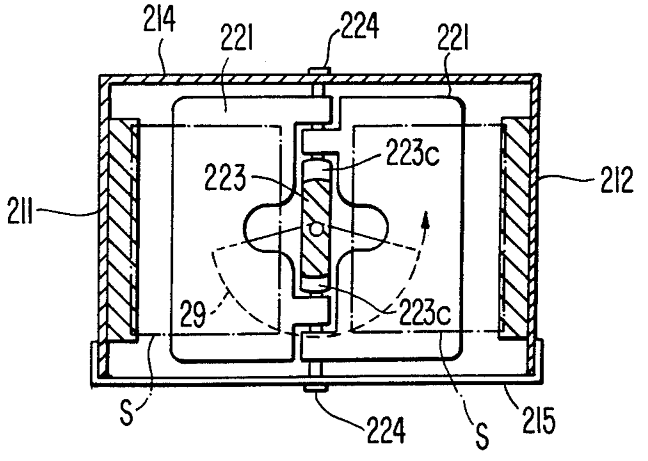
FIG. 14 is a cross-sectional view taken along line E—E of FIG. 13.

Referring now to FIGS. 13 and 14, another embodiment of the present invention is shown. This embodiment is directed to a modification of the holder member of FIGS. 4 and 5 to improve the dispensing operation and the holding capability of the hold member. Similar parts are represented by the same reference numerals used in FIGS. 4–11, and the description of similar parts is omitted for simplicity.

Figure 15A:
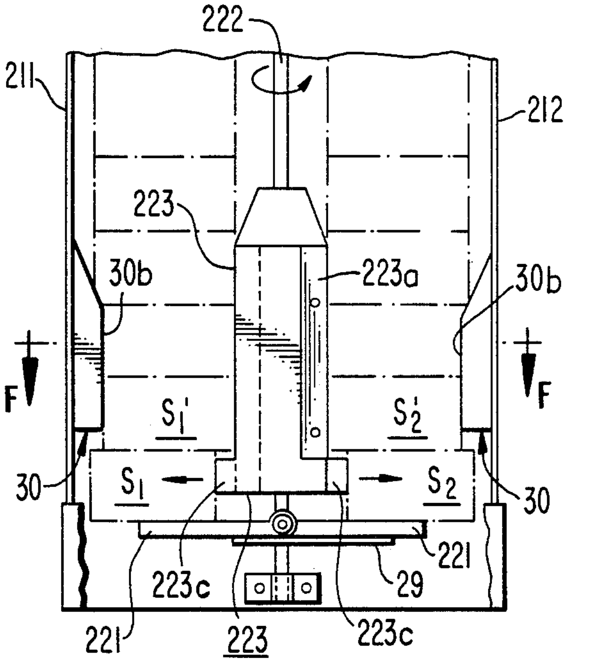
FIG. 15(*a*) is a partial front end view of the article dispensing mechanism of FIG. 13 illustrating its operation.
Figure 16A:
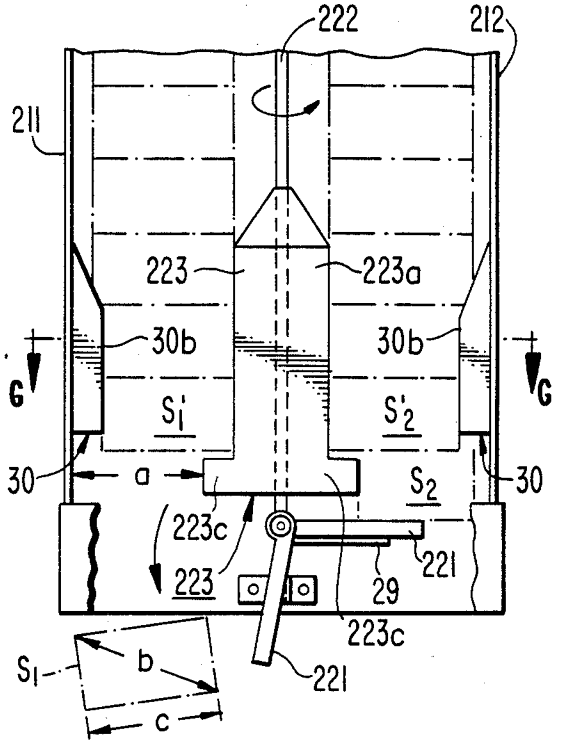
FIG. 16(*a*) is a partial front end view of the article dispensing mechanism of FIG. 13 illustrating its operation.
Figure 15B:
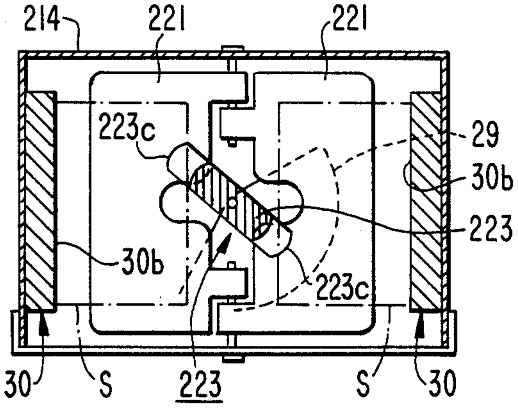
Figure 16B:
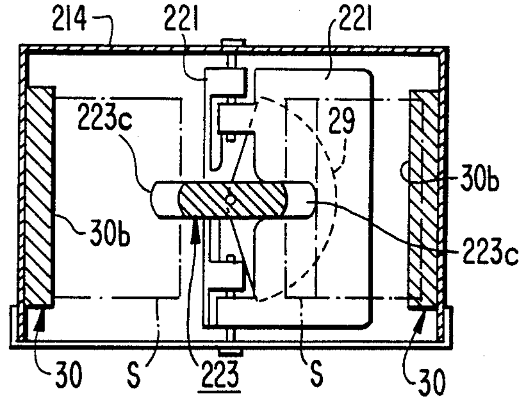

Holder member 223 of FIGS. 13–14 includes projections 223*c* which project from the lower end of each short side of holder member 223. Projections 223*c* oppose lowermost articles $S_1$, $S_2$ as best shown in FIGS. 15–16. During rotation of rotatable shaft 222, the edge surfaces of projections 223*c* contact the side surfaces of lowermost articles, $S_1$, $S_2$ and push these articles toward the inner surface of side plates 211 and 212. Thus, articles $S_1$ and $S_2$ are placed on the outer edge of flappers 211. Articles $S_1'$, $S_2'$, . . . , which are stacked on top of lowermost articles $S_1$ and $S_2$, are held in place between holding surface 233*a* of holder member 223 and the inner surface of side spacer 30. Articles $S_1+$, $S_2'$, . . . also are supported by the upper surface of projections 223*c*.

Figure 17A:
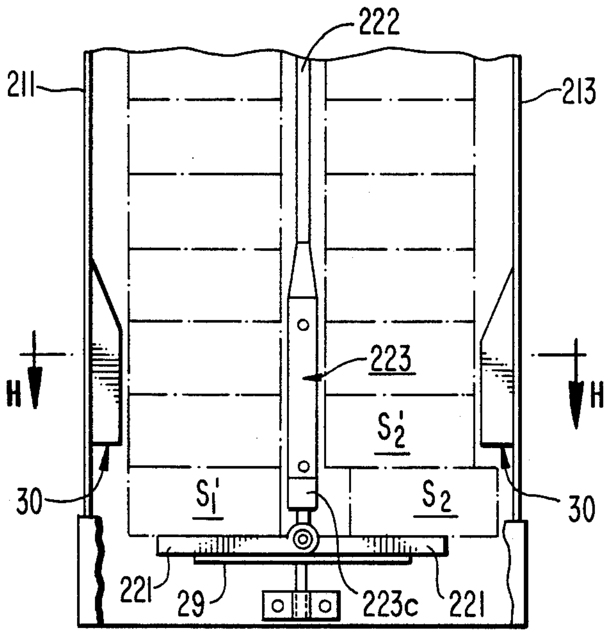
FIG. 17(*a*) is a partial front end view of the article dispensing mechanism of FIG. 13 illustrating its operation.
Figure 17B:
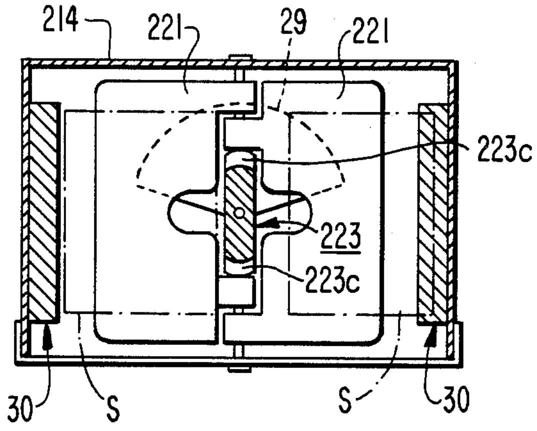

As shown in FIGS. 16–17, when one flapper 221 is released due to rotation of control plate 29, flapper 221 pivots downwardly and article $S_1$ disposed on flapper 221 is dispensed. Other articles $S_2$, $S_1'$, $S_2'$, . . . are held in their stacked position by holding member 223 and side spacer 30 as shown in FIG. 16. Thus, with this arrangement, article $S_1$ is smoothly dispensed and the other articles are securely held in their stacked position. As further shown in FIG. 16, if distance "a" between the inner surface of side plates 211, 212 and the end surface of projections 223*c* is defined as $c<a<b$, where "b" is the diagonal line distance of the articles and "c" is the width of the articles, then individual articles S can be smoothly dispensed without rotation of the articles.

Figure 18A:
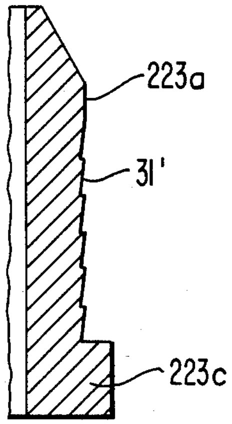
FIGS. 18(*a*) and (*b*) are cross-sectional views of the holder member used in FIG. 13.
Figure 18B:
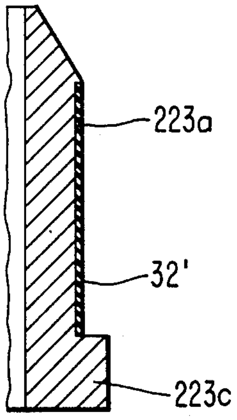

In a manner similar to FIGS. 12(*a*) and 12(*b*), the holding capability or frictional resistance of the short side or holding surfaces 223*a* of holder member 223 can be improved by including an antiskid surface. As shown in FIG. 18(*a*), notched surface 31' may be used or, as shown in FIG. 18(*b*), rubber sheet 32' may be fastened to holding surfaces 223*a* of holder member 223.

This invention has been described in detail in connection with the preferred embodiments, but these embodiments are merely for example only and this invention is not restricted thereto. It will be easily understood by those skilled in the art that other variations and modifications can be easily made within the scope of this invention, as defined by the appended claims.

We claim:

1. In an article dispenser for dispensing articles from a vending machine, said article dispenser including an article storage area in which the articles are held in two vertically adjacent rows in a stacked disposition above a bottom opening through which the lowermost articles are dispensed and a dispensing mechanism to dispense the lowermost articles stacked in said storage area through said bottom opening, said dispensing mechanism including a rotatable shaft vertically extending within said storage area between the two vertically adjacent rows, a pair of flappers pivotably supported within said storage area adjacent to the lower end of said rotatable shaft to cover the bottom opening in said storage area and control plate means fixed on the lower end of said rotatable shaft in contact with the lower surface of said flappers for controlling the pivoting of each of said flappers upon rotation of said rotatable shaft to selectively open and close said flappers to dispense the lowermost stacked articles in the two vertically adjacent rows, the improvement comprising article holder means in said dispensing mechanism for holding all articles except the lowermost articles in both vertically adjacent rows of articles in a stacked disposition during the opening of said flappers by said control plate means so that only the lowermost stacked articles are dispensed through said bottom opening, said article holding means having two opposite holding surfaces adjacent the two vertically adjacent rows of articles to frictionally engage articles in both the vertically adjacent rows of articles.

2. The article dispenser of claim 1 wherein said article holding means further comprises side spacers mounted on inner surfaces of said storage area.

3. The article dispenser of claim 1 wherein said article holding means further comprises a projection at the lower end of each of said holding surfaces which extends below the lowermost articles held by said article holding means.

4. The article dispenser of claim 1 wherein said holding surfaces of said article holding means have an anti-skid surface.

5. The article dispenser of claim 4 wherein said anti-skid surface is formed by notches.

6. The article dispenser of claim 4 wherein said anti-skid surface is formed by a rubberized sheet.

* * * * *